(12) United States Patent
Furui

(10) Patent No.: US 8,445,830 B2
(45) Date of Patent: May 21, 2013

(54) CORRECTION INFORMATION CALCULATING DEVICE, IMAGE PROCESSING APPARATUS, IMAGE DISPLAY SYSTEM, AND IMAGE CORRECTING METHOD INCLUDING DETECTION OF POSITIONAL RELATIONSHIP OF DIAGRAMS INSIDE PHOTOGRAPHED IMAGES

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 13/022,082

(22) Filed: Feb. 7, 2011

(65) Prior Publication Data

US 2011/0210987 A1 Sep. 1, 2011

(30) Foreign Application Priority Data

Feb. 26, 2010 (JP) ................. 2010-042465

(51) Int. Cl.
*H01L 27/00* (2006.01)
(52) U.S. Cl.
USPC ........................................ 250/208.1; 353/94
(58) Field of Classification Search
USPC ............... 250/208.1, 221, 214 R; 353/94, 69, 353/101; 348/745–747, 135; 345/682, 699; 382/275, 282, 300

See application file for complete search history.

(56) References Cited

U.S. PATENT DOCUMENTS

| 7,338,175 B2 * | 3/2008 | Miyazawa et al. .............. 353/94 |
| 2004/0085256 A1 | 5/2004 | Hereld et al. |
| 2008/0136976 A1 | 6/2008 | Ajito et al. |

FOREIGN PATENT DOCUMENTS

WO WO 2006/025191 A1 3/2006

* cited by examiner

*Primary Examiner* — Que T Le
(74) *Attorney, Agent, or Firm* — Oliff & Berridge, PLC

(57) ABSTRACT

A correction information calculating device includes: a position information acquiring unit that acquires position information representing a position corresponding to a first diagram located inside a first photographed image; a second diagram position detecting unit that detects a position of a second diagram, that is different from the first diagram in at least one of a shape and a size, inside a second photographed image; and a correction information calculating unit that calculates correction information representing a correspondence relationship between a position of a pixel on the projection surface and a position of a pixel of an image forming element of a projector by comparing the position of the second diagram inside the second photographed image that is detected by the second diagram position detecting unit and the position of the second diagram on an original data of the second measurement image.

19 Claims, 7 Drawing Sheets

CORRECTION INFORMATION CALCULATING DEVICE, IMAGE PROCESSING APPARATUS, IMAGE DISPLAY SYSTEM, AND IMAGE CORRECTING METHOD INCLUDING DETECTION OF POSITIONAL RELATIONSHIP OF DIAGRAMS INSIDE PHOTOGRAPHED IMAGES

BACKGROUND

1. Technical Field

The present invention relates to a correction information calculating device, an image processing apparatus, an image display system, and an image correcting method.

2. Related Art

Generally, as one example of an image display device, a projector is known. Projectors have advantages such as ease of installation and the ability to display a big screen image. The projectors are used for displaying an image on a planar or curved projection surface. In addition, there are cases where projectors are used for displaying one image as the entirety of a plurality of partial images by projecting the partial images from a plurality of projectors. Recently, an image correcting method for correcting the distortion of images on the projection surface or a difference between relative positions of a plurality of partial images is proposed.

In the above-described image correcting method, for example, the following process is performed. First, a measurement pattern including characteristic points is projected from projectors, and the measurement pattern formed on the projection surface is photographed. Then, correction information representing the amount of correction of the positions of pixels is acquired based on the correspondence relationship between the position of a characteristic point on image data representing the measurement pattern and the position of the characteristic point in the photographed image acquired by photographing the measurement pattern. In a case where an image (hereinafter, referred to as a content image) for a viewer is displayed, image data representing the image is corrected based on the above-described correction information, and an image is displayed based on the corrected image data.

In performing the above-described process, it may be difficult to precisely specify the correspondence relationship between the characteristic points projected onto the photographed image and the projected characteristic points depending on the number or the shape of the characteristic points. When the specifying of the correspondence relationship fails, the process needs to be retried, and the process cannot be performed in an extreme case. As a technology for resolving such disadvantages, there is a technology disclosed in PCT International Publication Pamphlet No. 06/025191. In the technology disclosed in PCT International Publication Pamphlet No. 06/025191, the coordinates of several characteristic points are designated by a user, and the coordinates of the remaining characteristic points are estimated based on the coordinates of the several coordinates through interpolation calculation.

In the technology disclosed in PCT International Publication Pamphlet No. 06/025191, since the coordinates of the characteristic points are designated by the user, and an operation for searching for characteristic points as designated targets is the responsibility of the user, there may be the following disadvantages.

In a case where a measurement pattern including a plurality of characteristic points is used, a case where diagrams representing the characteristic points are all the same, or the like, considerable effort and time are necessary for searching for the characteristic points as designated targets, whereby a considerable burden is placed on the user. In addition, the user may easily incorrectly recognize the characteristic points as the designated targets, and there is a concern about a decrease in the degree of robustness of the process.

SUMMARY

An advantage of some aspects of the invention is that it provides a correction information calculating device, an image processing apparatus, an image display system, and an image correcting method capable of acquiring a precise correspondence relationship between the characteristic points projected onto a photographed image and the characteristic points on the projection surface while suppressing the user's burden to a minimum level.

According to an aspect of the invention, there is provided a correction information calculating device including: a position information acquiring unit that acquires position information, which is input by a user, as information representing a position corresponding to a first diagram located inside a first photographed image acquired by photographing the first diagram on a projection surface when a first measurement image including the first diagram is projected onto the projection surface from a projector; a second diagram position detecting unit that detects a position of a second diagram inside a second photographed image acquired by photographing the second diagram on the projection surface by using a detection result at a time of detecting a position of the first diagram inside the first photographed image with a position represented by the position information used as a reference and a positional relationship of a position of the second diagram on original data of a second measurement image with respect to the position of the first diagram on original data of the first measurement image when the second measurement image including the second diagram that is different from the first diagram in at least one of a shape and a size is projected onto the projection surface from the projector; and a correction information calculating unit that calculates correction information representing a correspondence relationship between a position of a pixel on the projection surface and a position of a pixel of an image forming element of the projector by comparing the position of the second diagram inside the second photographed image that is detected by the second diagram position detecting unit and the position of the second diagram on the original data of the second measurement image.

According to the above-described correction information calculating device, the first diagram is detected by using the position information input by the user. Accordingly, the success rate of detection of the first diagram increases, thereby the position of the second diagram can be precisely acquired. Since at least one of the shape and the size of the second diagram are different from that of the first diagram, it is easy for the user to differentiate the first diagram from the second diagram. Accordingly, the user's effort for searching for the first diagram can be reduced, and occurrence of user's incorrect recognition of the first diagram can be decreased. Thus, the correspondence relationship between the characteristic point transferred into the photographed image and the characteristic point on the projection surface can be precisely acquired while suppressing the user's burden. Therefore, the correction information that can be used for correcting the image distortion or the like with high precision can be acquired with reduced effort.

The above-described correction information calculating device may further include a first diagram position detecting unit that detects the position of the first diagram inside the first photographed image, wherein the second diagram position detecting unit detects the position of the second diagram inside the second photographed image using a detection result of the first diagram position detecting unit when the first diagram position detecting unit succeeds in detecting the first diagram and detects the position of the second diagram inside the second photographed image by using the position of the first diagram that is detected using the position information when the first diagram position detecting unit fails to detect the first diagram.

In such a case, when the first diagram position detecting unit succeeds in detecting the position of the first diagram, the second diagram position detecting unit detects the second diagram using the detection result. Thus, when the first diagram position detecting unit succeeds in detecting the position of the first diagram, user's input of the position information can be omitted. Accordingly, the correspondence relationship between the characteristic point transferred into a photographed image and the characteristic point on the projection surface can be precisely acquired while suppressing the user's burden to a minimum level.

In addition, in the above-described correction information calculating device, it may be configured that the position information includes first position information representing a position of an inner side of the first diagram and second position information representing a position of a characteristic point that defines the position of the first diagram inside the first photographed image, the position information acquiring unit acquires the second position information when detection of the position of the first diagram using the first position information fails, and the second diagram position detecting unit detects the position of the second diagram inside the second photographed image by using the position of the first diagram that defined in the characteristic point represented by the second position information as the position of the first diagram inside the first photographed image when the position information acquiring unit acquires the second position information.

In such a case, since the user can input the first position information representing the position located on the inner side of the first diagram, the position that becomes a reference for detecting the first diagram can be designated in an easy manner, whereby the user's burden can be suppressed to a minimum level. In addition, when failing to detect the position of the first diagram inside the first photographed image with the position represented by the first position information used as a reference, the second diagram position detecting unit detects a second diagram by using the position of the first diagram that is defined in the characteristic point represented by the second position information. Accordingly, divergence of the process due to a failure of detection of the first diagram can be avoided.

In addition, in the above-described correction information calculating device, it may be configured that the first measurement image includes the second diagram, and the second diagram position detecting unit detects the position of the second diagram inside the second photographed image using the first photographed image as the second photographed image.

In such a case, compared to a case where the second measurement image is projected independently from the first measurement image so as to be photographed, the effort and the time required for projection or photographing can be reduced. In addition, a probability that a positional difference of the photographing device or the like occurs between photographing of the first measurement image and photographing of the second measurement device is lowered. Therefore, an error due to positional misalignment of the photographing device can be decreased.

In addition, in the above-described correction information calculating device, it may be configured that a size of the first diagram is larger than a size of the second diagram, and the number of the second diagrams included in the first measurement image is greater than the number of the first diagrams included in the first measurement image.

In such a case, since the size of the first diagram is larger than that of the second diagram, the user can easily differentiate the first diagram from the second diagram, and accordingly, the user's burden required for searching for the first diagram can be suppressed to a minimum level. In addition, since the number of the second diagrams included in the first measurement image is greater than that of the first diagrams, comparison between the position of the second diagram inside the second photographed image and the position of the second diagram defined in the original data of the first measurement image can be performed in multiple points, whereby the correction information can be acquired with high precision.

In addition, in the above-described correction information calculating device, it may be configured that a hue of the first diagram is different from a hue of the second diagram in the first measurement image, and a photographed image acquired by photographing the first measurement image on the projection surface such that the hue of the first diagram is different from the hue of the second diagram is used as the first photographed image.

In such a case, the hue of the first diagram on the projection surface is different from that of the second diagram, and accordingly, the user can easily differentiate the first diagram from the second diagram. Accordingly, the user's burden required for searching for the first diagram can be suppressed to a minimum level. In addition, the hue of the first diagram and the hue of the second diagram are different from each other in the first photographed image, filtering using a difference in colors can be performed so as to exclude the influence of the second diagram in a case where the first diagram is detected. Accordingly, the success rate of the first diagram can be increased. Similarly, in a case where the second diagram is detected, filtering can be performed so as to exclude the influence of the first diagram, whereby the success rate of detection of the second diagram can be increased.

According to another aspect of the invention, there is provide an image processing apparatus including: the above-described correction information calculating device; and an image correcting unit that corrects image data such that an image projected onto the projection surface by projectors based on the image data after correction approximately coincides with an image represented by the image data before correction by referring to correction information calculated by the correction information calculating device.

According to the above-described correction information calculating device, the correction information with high precision can be acquired with a little effort. Therefore, according to the above-described image processing apparatus, the distortion of partial images or a difference in the relative positions of the partial images can be corrected with high precision without any effort for acquiring the correction information.

According to still another aspect of the invention, there is provided an image display system including: the above-described image processing apparatus; and a plurality of projectors that projects an image based on image data after correction that is corrected by the image processing apparatus.

According to the above-described information processing apparatus, the distortion of partial images or a difference in the relative positions of the partial images can be corrected with high precision without any effort for acquiring the correction information. Therefore, the above-described image display system has a high degree of convenience and can display a high-quality image.

According to yet another aspect of the invention, there is provided a method of correcting an image, including: projecting a first measurement image including a first diagram onto a projection surface from a projector; acquiring a first photographed image by photographing the first diagram on the projection surface; acquiring position information, which is input by a user, as information representing a position corresponding to the first diagram inside the first photographed image; projecting a second measurement image including a second diagram that is different from the first diagram in at least one of a shape and a size on the projection surface from the projector; acquiring a second photographed image by photographing the second diagram on the projection surface; detecting a position of the first diagram inside the first photographed image with a position represented by the position information for the position of the second diagram inside the second photographed image used as a reference; detecting a position of the second diagram inside the second photographed image by using a detection result of the position of the first diagram inside the first photographed image and a positional relationship of the position of the second diagram on original data of the second measurement image with respect to the position of the first diagram on original data of the first measurement image; calculating correction information representing a correspondence relationship between a position of a pixel on the projection surface and a position of a pixel of an image forming element of the projector by comparing a detection result of the position of the second diagram inside the second photographed image and the position of the second diagram on the original data of the second measurement image; and correcting image data such that an image projected onto the projection surface by the projector based on the image data after correction approximately coincides with an image represented by the image data before correction by referring to the correction information.

According to the above-described image correcting method, the correspondence relationship between the characteristic point transferred into the photographed image and the characteristic point on the projection surface can be precisely acquired while suppressing the user's burden. Therefore, the image distortion or the like can be corrected with high precision without any effort for acquiring the correction information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
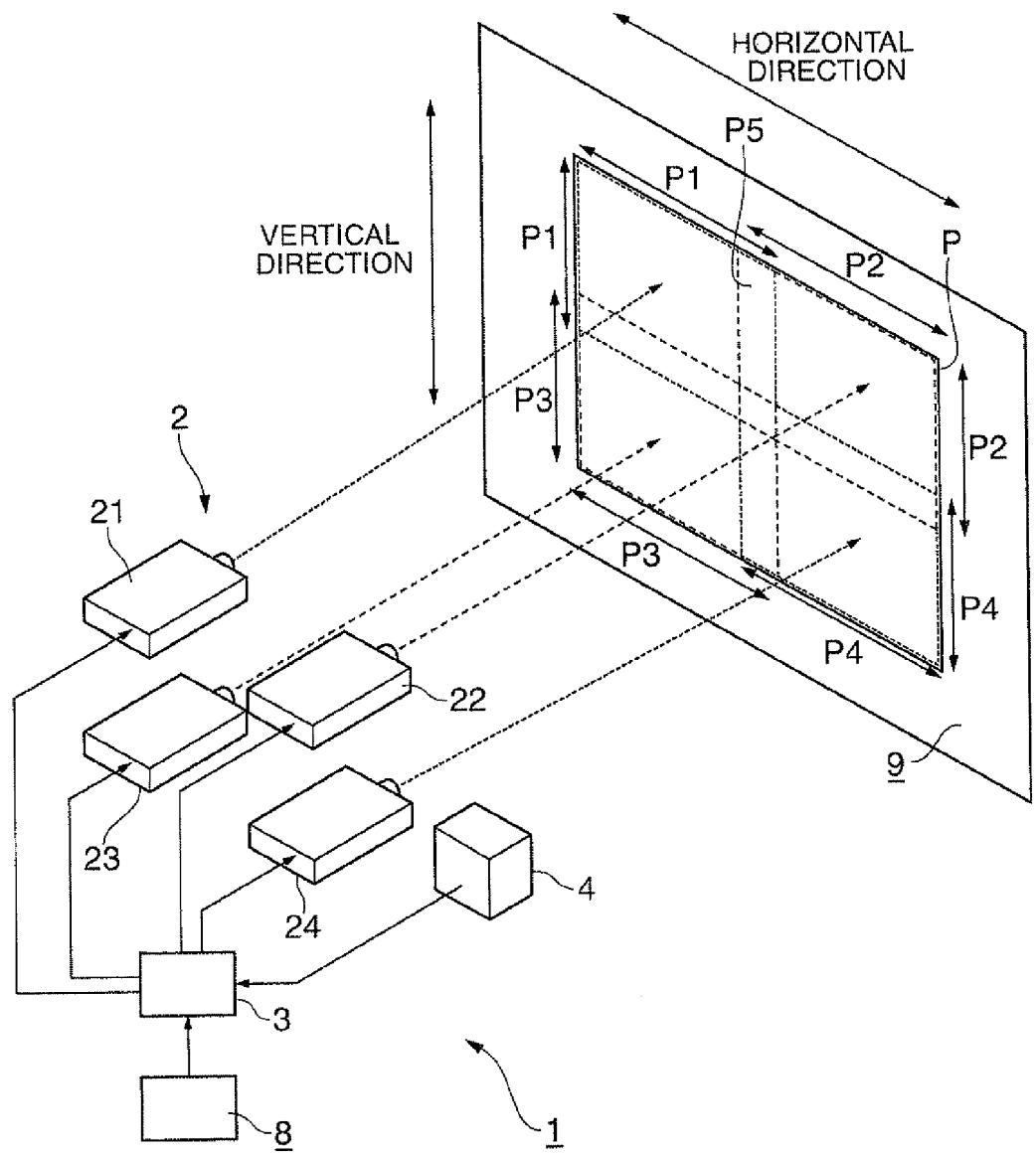
FIG. 1 is a schematic diagram showing an image display system according to an embodiment of the invention.

Hereinafter, embodiments of the invention will be described with reference to the accompanying drawings. In the drawings referred to, in order to represent characteristic parts to be easily understood, the size and the scale of a structure may be differently shown in the figures. In addition, to the same constituent elements, the same reference numeral is assigned, and detailed description thereof may be omitted.

Figure 2:
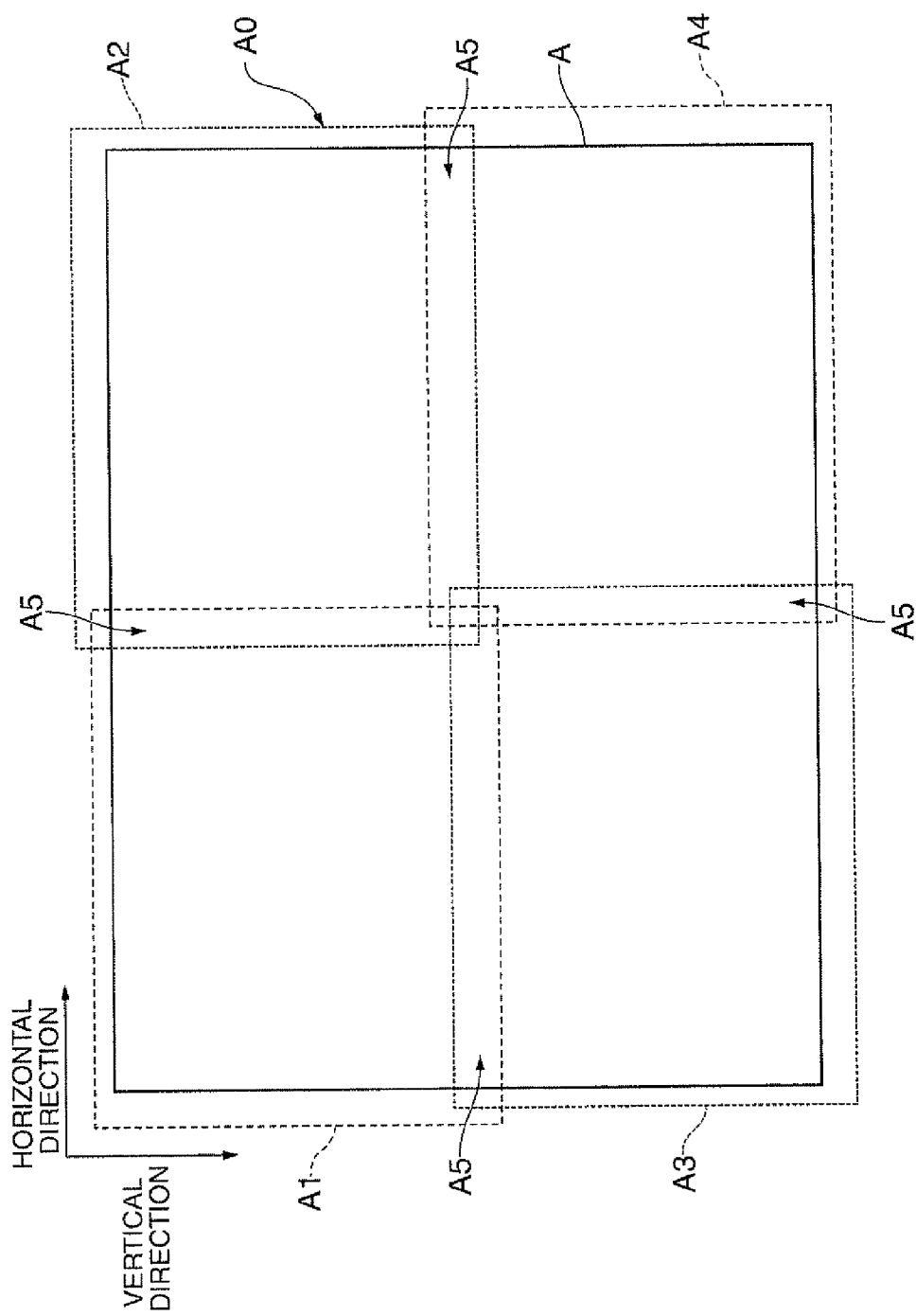
FIG. 2 is an explanatory diagram showing the positional relationship of a projection area on a projection surface.

FIG. 1 is a conceptual diagram of an image display system according to an embodiment of the invention. FIG. 2 is an explanatory diagram showing the relationship between an image projected onto a projection surface and a projection area.

As shown in FIG. 1, the image display system 1 includes a plurality of projectors 2, an image processing apparatus 3, and a photographing device 4. The image display system 1 projects a content image P, for example, represented by image data input from a signal source 8 onto a projection surface 9 such as a screen or a wall by using a plurality of projectors 2 in a sharing manner. Here, it is assumed that a first projector 21, a second projector 22, a third projector 23, and a fourth projector 24 are provided as the plurality of projectors 2. Here, the number or the arrangement of the projectors is not particularly limited. For example, an embodiment of the invention can be applied to a case where an image is projected onto a projection surface having a planar or curved shape by one projector. In the description presented below, an image projected by each of the plurality of projectors may be referred to as a "partial image". In addition, in the description presented below, image data representing the partial image may be referred to as "partial image data".

The projector 2 can display an image (here, a partial image) based on supplied image data (here, partial image data). The configuration of the projector is not particularly limited. For example, the projector 2 may be a single plate-type projector or a projector such as a three plate-type projector that includes a plurality of image forming elements. In addition, the projector 2 may be a front projection-type that projects an image onto the projection surface 9 from the viewer side or a rear projection-type that projects an image from a side opposite to the viewer with the projection surface 9 interposed therebetween.

Each of the plurality of projectors 2 according to this embodiment includes a light source, an image forming element, and a projection optical system. The image forming element has a plurality of pixels that is two-dimensionally arranged. Examples of the image forming element include a transmission-type or reflection-type liquid crystal light valve and a digital mirror device (DMD). In each projector, light emitted from the light source is incident to the image forming element. The image forming element independently controls the plurality of pixels based on data for each pixel (hereinafter, referred to as pixel data) out of the partial image data that is input to the projector. The light incident to the pixel is modulated for each pixel so as to be light having light intensity defined by the pixel data. The light modulated by the plurality of pixels forms an optical image (image) as a whole, and this optical image is projected onto the projection surface 9 by the projection optical system. Here, in the plurality of projectors, the number of pixels of the image forming elements and the arrangement of the pixels are the same.

The projection area that is an area in which each projector can project an image onto the projection surface 9 is set differently for the plurality of the projectors 2. As shown in FIG. 2, the first to fourth projection areas A1 to A4 are set such that edge portions thereof overlap one another and form a total projection area as a whole. In other words, each of the first to fourth projection areas A1 and A4 includes an overlapping area A5 that overlaps another projection area that is adjacent thereto.

The projection area (the first projection area A1) of the first projector 21 is aligned with the projection area (the second projection area A2) of the second projector 22 in the horizontal direction on the projection surface 9. In this horizontal direction, the end portion of the first projection area A1 overlaps the end portion of the second projection area A2. The positional relationship between the projection area (the third projection area A3) of the third projector 23 and the projection area (the fourth projection area A4) of the fourth projector 24 in the horizontal direction is similar to that between the first and second projection areas A1 and A2 in the horizontal direction.

The first projection area A1 is aligned with the third projection area A3 in the vertical direction that is perpendicular to the horizontal direction on the projection surface 9. In this vertical direction, the end portion (the edge portion) of the first projection area A1 overlaps the end portion (the edge portion) of the third projection area A3. The positional relationship between the second projection area A2 and the fourth projection area A4 in the vertical direction is similar to that between the first and third projection areas A1 and A3 in the vertical direction.

However, generally, the outer shape of the total projection area A0 is not formed in a rectangular shape. The reason for this is that there is distortion or a difference in the relative positions of the first to fourth projection areas A1 to A4 due to arrangement of the first to fourth projectors 21 to 24. Here, an approximately rectangular area fitted in the total projection area A0 is set as the area (an effective projection area A) that is used for actual projection of an image. The first to fourth projectors 21 to 24 project the partial images in an area of the projection areas that is fitted in the effective projection area A.

For example, a first partial image P1 is displayed in an area of the first projection area A1 that is fitted in the effective projection area A in accordance with light projected from the first projector 21. Similarly, second to fourth partial images P2 to P4 are displayed by the second to fourth projectors 22 to 24. The first to fourth partial images P1 to P4 are displayed onto the projection surface 9 with end portions thereof overlapping each other and configure the content image P as a whole.

Referring back to FIG. 1, the image processing apparatus 3 receives image data representing the content image P, for example, from the signal source 8. The image processing apparatus 3 performs various processes (to be described later) for the image data and generates a plurality of the partial image data based on the image data. Each partial image data is data representing any one of the first to fourth partial images P1 to P4. The image processing apparatus 3 supplies the partial image data representing the partial image of each projector to the first to fourth projectors 21 to 24. The first to fourth projectors 21 to 24 projects the first to fourth partial images P1 to P4 on the projection surface 9 based on the partial image data input from the image processing apparatus 3.

The image processing apparatus 3 performs a process (hereinafter, referred to as a position correcting process) of correcting the image distortion of each of the first to fourth partial images P1 to P4 and differences of the relative positions of the first to fourth partial images P1 to P4, as one of the above-described various processes. The image processing apparatus 3 calculates correction information that is used for the position correcting process at appropriately selected timing such as at the time of installation of the image display system 1 or at the time of maintenance when a predetermined period elapses from the time of installation of the image display system 1.

As one example of the image distortion, for example, there is image distortion (for example, keystone distortion) that occurs in accordance with an elevation angle or a depression angle in each projection direction of the first to fourth projectors 21 to 24 with respect to the projection surface 9, that is, the vertical direction, a swing angle in the horizontal direction, or the like. As another example of the image distortion, there is image distortion that occurs due to local distortion of the projection surface 9, for example, caused by deflection or the like of a cloth-shaped screen. The differences in the relative positions of the first to fourth partial images P1 to P4 are, for example, due to discordance of the projection directions, misalignment of the relative positions, or the like of the first to fourth projectors 21 to 24.

The image processing apparatus according to the embodiment of the invention can have various forms such as the following first to third forms.

As an image processing apparatus of the first form, a configuration that is configured by one or more logic circuits such as an ASIC that performs various processes may be used. A part or the whole of the image processing apparatus of the first form may be integrated with any of the first to fourth projectors 21 to 24, the photographing device 4, and the signal source 8.

As an image processing apparatus of the second form, a configuration of a computer in which a program is installed may be used. In other words, by allowing a computer to perform various processes in accordance with a program, the function of the image processing apparatus can be realized. For example, by performing the operation of each process using a memory and a CPU in a cooperative manner, storing the result of the operation in a memory unit such as a hard disk or a memory, and reading out the result of the operation and providing the result to another process as necessary, the result of the process as in a case where a logic circuit or the like is used can be acquired. In addition, in the image processing apparatus 3 of the second form, various processes may be performed by a plurality of computers in a sharing manner.

As an image processing apparatus of the third form, a configuration in which a logic circuit performing a part of the various processes and a computer performing the other parts of the various processes in accordance with a program are combined may be used.

In this manner, an image processing apparatus according to an embodiment of the invention may also have a form as a set of a plurality of functional units each performing a part of various processes, other than the form of an independent device performing various processes. In other words, a form in which a plurality of functional units is divided into a plurality of separate devices, and the functional units perform the processes in a cooperative manner may be used.

The photographing device 4 can acquired photographed image acquired by photographing an area on the projection surface 9 including the entirety of the total projection area A0. The photographing device 4, for example, is configured by a two-dimensional image sensor such as a CCD camera. The two-dimensional image sensor has a structure in which a plurality of light receiving elements formed from photo diodes or the like is two-dimensionally arranged. The photographing device of this embodiment is configured by full-color two-dimensional image sensors that can reflect a difference in the hues of photographing targets into a photographed image.

In a case where the correction information is calculated, the photographing device 4 photographs a first measurement image and a second measurement image that are projected onto the projection surface 9 by the first to fourth projectors 21 to 24 simultaneously or independently and outputs photographed image data representing a photographing result to the image processing apparatus 3. Here, the "first measurement image" includes a first diagram, and the "second measurement image" includes a second diagram. In the description presented below, the first measurement image and the second measurement image are referred to as "measurement patterns". In addition, a photographed image acquired by photographing the first diagram on the projection surface 9 when the first measurement image is projected onto the projection surface 9 from the projectors is referred to as a "first photographed image". In addition, a photographed image acquired by photographing the second diagram on the projection surface 9 when the second measurement image is projected onto the projection surface 9 from the projectors is referred to as a "second photographed image". The first measurement image used as a measurement pattern of this embodiment includes the first diagram and the second diagram, which will be described in detail later. In other words, the first measurement image of this embodiment also serves as the second measurement image, and a photographed image acquired by photographing the first measurement image projected onto the projection surface 9 can be used as either a first photographed image or a second photographed image. In addition, in a case where the first photographed image and the second photographed image do not need to be differentiated from each other, both the first photographed image and the second photographed image may be simply referred to as photographed images.

The photographing device 4 of this embodiment is arranged such that the entirety of the total projection area A0 can be photographed by performing one photographing operation. Compared to a case where the entirety of the total projection area A0 is photographed by adjusting photographed images acquired by several photographing operations, an error due to movement of the photographing device between photographing operations can be eliminated. Depending on the size or the aspect ratio of the total projection area A0, the entirety of the total projection area A0 may not be fitted in the viewing angle of the photographing device. In such a case, a photographed image that is acquired by photographing the entirety of the total projection area A0 may be acquired by photographing parts of the total projection area A0 in the state in which the relative position of the photographing device with respect to the projection surface 9 is approximately fixed by mounting the photographing device on a tripod or the like and combining results of two or more photographing operations.

When a content image P is displayed by a plurality of projectors 2 as above, the content image P can be displayed with high resolution and high luminance on a big screen. For example, compared to a case where a content image is displayed by one projector, under a condition that the number of pixels of each projector is the same, the content image P can be displayed on a big screen without decreasing the resolution. On the other hand, when compared under a condition that a content image P is displayed with the same screen size, the number of pixels can be increased in accordance with the number of the projectors, whereby the content image can be displayed with high resolution. In addition, when compared under a condition that the intensity of output light of each projector is the same, the intensity of light contributing to display can be increased in accordance with the number of the projectors, whereby the content image P can be displayed with high luminance.

When compared to a technique of increasing the number of pixels or the output level of the projector for acquiring the above-described advantages, the cost of each projector can be dramatically reduced. Accordingly, a decrease in the cost of the device can be expected even when the number of projectors is increased. In addition, It is possible that the projectors are installed and used at different places (for example, conference rooms) for an ordinary use, and an image display system is built, for example, at a main conference room in accordance with the use so as to display a content image with high resolution and high luminance on a big screen. As above, whether the projectors are individually used or a plurality of the projectors is used in a combined manner can be selected in accordance with the use. Accordingly, compared to a case where the above-described advantages are to be acquired by using one projector, the convenience is improved.

In addition, since the content image P is displayed based on the image data for which the position correcting process has been performed by the image processing apparatus 3, image distortion of each partial image and a difference in the relative positions of a plurality of the partial images are decreased. Thus, since the content image P can be display in a state in which image distortion is small, and it is difficult to recognize the joining portions of the partial images, the content image P can be displayed as an image having high quality. According to an embodiment of the invention, the image distortion of the partial images or a difference in the relative positions of the partial images can be corrected with high precision, and the correction information can be efficiently calculated. Therefore, the effort and time required for installation, for example, of an image display system can be decreased, whereby the convenience of the image display system can be improved.

Figure 3:
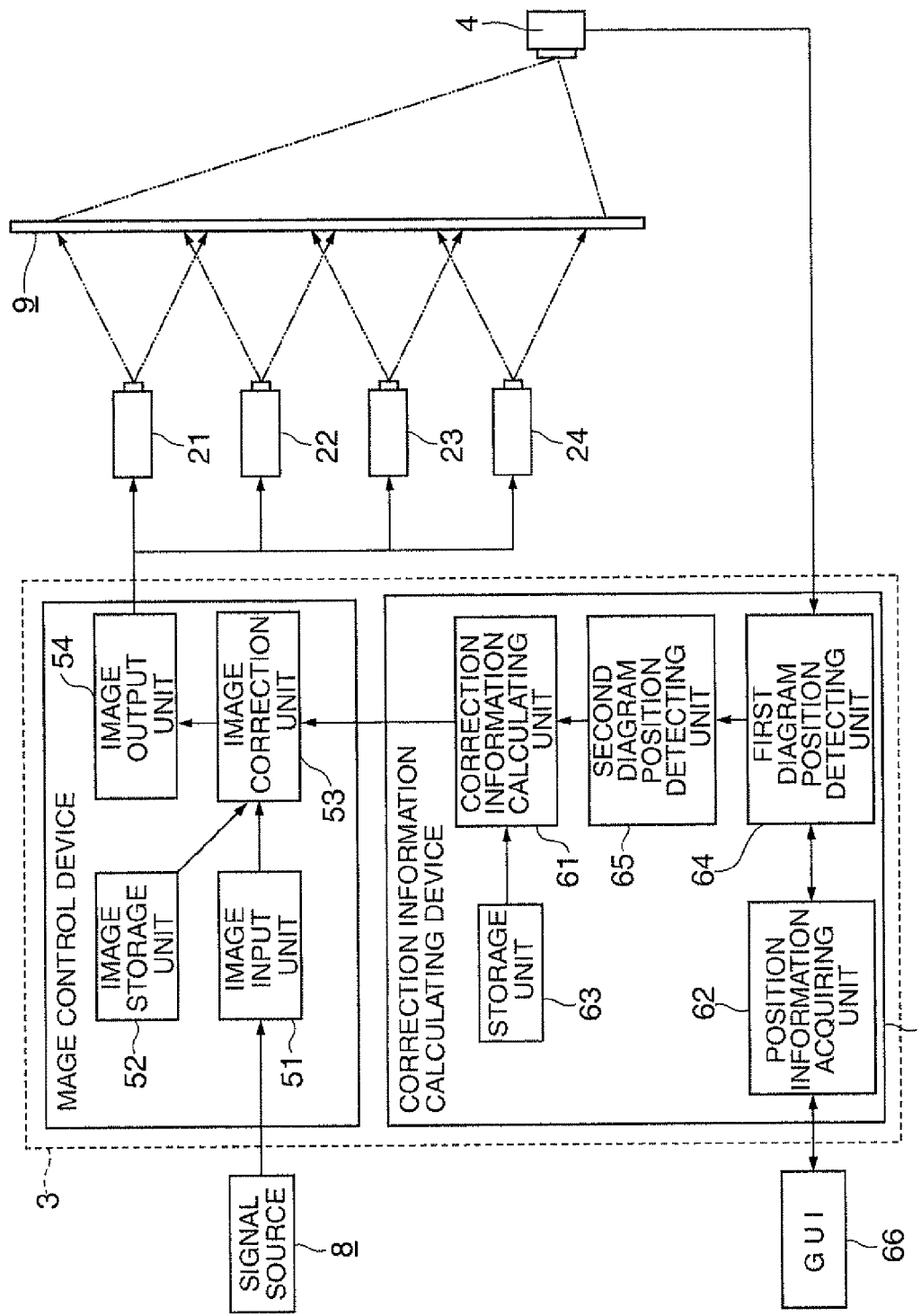
FIG. 3 is a diagram showing the configuration of the image display system.
Figure 4:
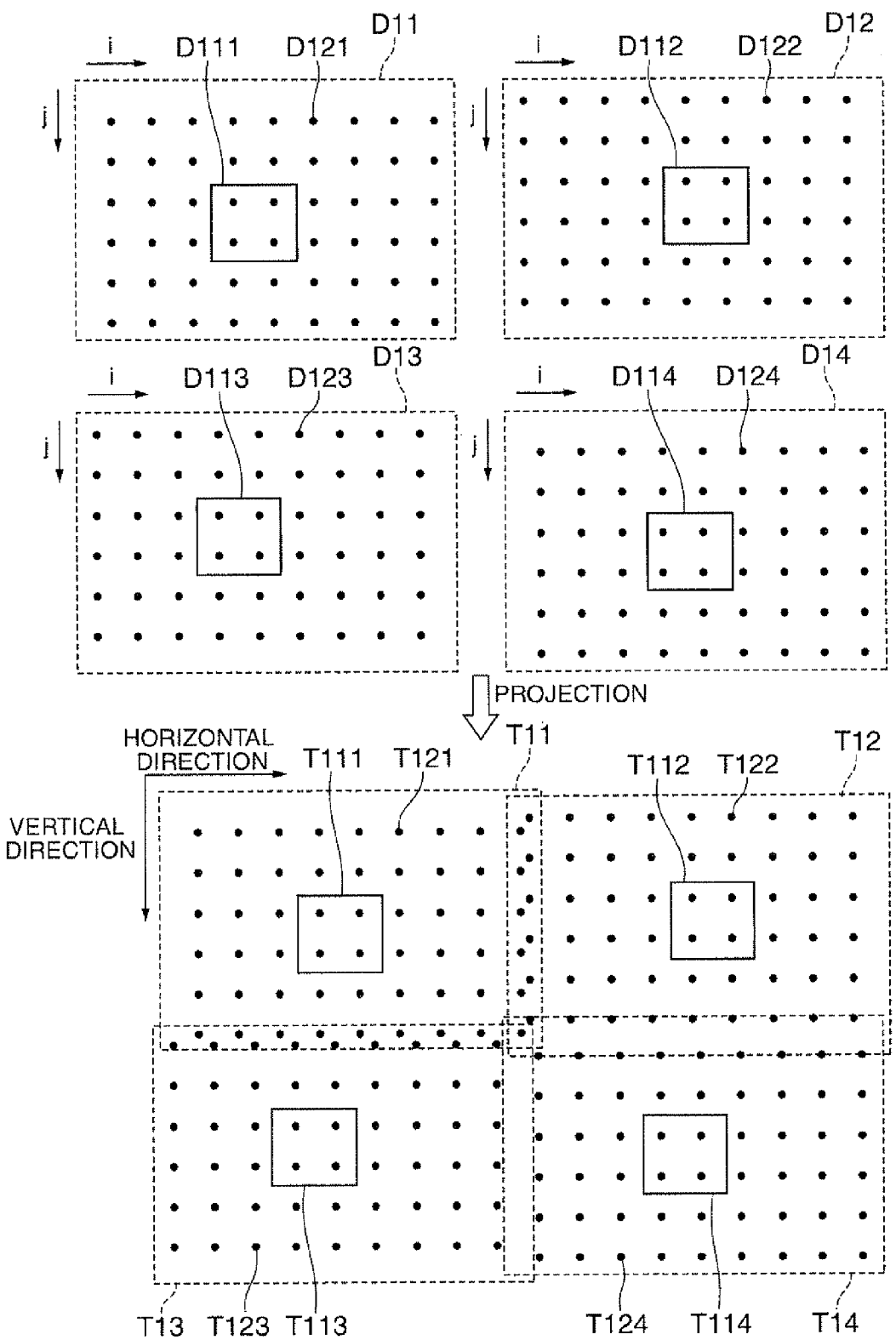
FIG. 4 is an explanatory diagram illustrating one example of a measurement pattern.

Next, the constituent elements of an image processing apparatus 3 according to an embodiment of the invention will be described in detail with reference to FIGS. 3 and 4. FIG. 3 is a diagram showing the functional configuration of the image processing apparatus 3. FIG. 4 is an explanatory diagram illustrating an example of the measurement pattern.

As shown in FIG. 3, the image processing apparatus 3 includes an image control device 5 and a correction information calculating device 6. The correction information calculating device 6 mainly calculates the correction information. The image control device 5 performs various processes and performs a position correcting process for image data using the correction information as one of the various processes. According to this embodiment, the image control device 5 is configured as a part of a first computer, and the correction information calculating device 6 is configured by using a CPU, a memory unit, and the like of a second computer that is configured to be separately from the first computer.

The image control device 5 includes an image input unit 51, an image storage unit 52, an image correction unit 53, and an image output unit 54. The image input unit 51 is configured, for example, by a video capture board or the like. The image input unit 51 receives a content image from a signal source 8 such as a DVD player or a communication device that is disposed outside the image control device 5 as is necessary. The image storage unit 52 is configured, for example, by a storage device such as a hard disk that is built in a computer or is externally disposed and can store image data that represents a content image P. The image data input to the image input unit 51 or the image data stored in the image storage unit 52 is output to the image correction unit 53 in a case where a content image P is displayed.

In addition, the image control device 5 may have a configuration in which only one of the image input unit and the image storage unit 52 is arranged. Furthermore, a configuration may be used in which the image data input from the image input unit 51 is stored in the image storage unit 52, and the image data is appropriately read out so as to be input the image correction unit 53.

The image correction unit 53 includes a calculation section and a memory section, of which a detailed configuration is not shown in the figure. The calculation section is configured, for example, by a graphic processing unit (GPU) or the like. The memory section is configured by a video memory (VRAM), a non-volatile memory, or the like. The image correction unit 53 corrects the image data input from the signal source 8 by referring to the correction information such that an image projected onto the projection surface 9 by the projectors 21 to 24 based on image data after correction approximately coincides with an image represented by the image data before correction.

The calculation section performs various processes such as gamma correction, color correction, and the like for the image data input to the calculation section while using the memory section as an image buffer or the like. The various processes may be performed through calculation of a CPU of the computer by using a program, instead of the GPU. In addition, there may be a case where the array of the pixels on the image data input from the image input unit 51 or the image storage unit 52 does not match the array of the pixels of the image forming element of the projector 2, for example, a case where the number of pixels included in the image data is different from that of the image forming element. In such a case, the calculation section corrects the image data such that image data after correction matches the array of the pixels of the image forming element by performing an interpolation process, a rendering process, or the like for the input image data. It may be configured that a process unit is disposed in each projector, and the above-described process is performed by the process unit for each projector.

The calculation section performs a position correcting process for the image data by referring to the correction information and generates partial image data. The correction information is stored in the storage unit (for example, a non-volatile memory). The correction information is information that represents the correspondence relationship between the position of each pixel occupying the total projection area A0 (see FIG. 2) on the projection surface 9 and the position of each pixel occupying the array of the pixels of the image forming elements of the plurality of projector 2.

The correction information, for example, is stored in a table format as values of pixels of the image forming element. In other words, by referring to the table (the correction information), a pixel of the image forming element to which each image data is input for displaying a predetermined pixel in a predetermined position on the total projection area A0 can be known.

The calculation section, in order to display an image represented by the image data before correction that is performed through the position correcting process, that is, a content image to be displayed in the effective projection area A, for example, performs the process as below. For each pixel (hereinafter, referred to as a non-display pixel) that is disposed inside the total projection area A0 but is disposed on the outside of the effective projection area A, the calculation section sets data supplied to each pixel of the image forming element that corresponds to each non-display pixel through the correction information to non-display mask data (for example, data representing black). In addition, for each pixel (hereinafter, referred to as a display pixel) that is disposed inside the effective projection area A, the calculation section sets data supplied to the pixel of the image forming element that corresponds to the display pixel through the correction information to data that is defined in image data as pixel data for a display pixel.

In a case where the position of the display pixel is displaced from the position of the lattice point of the lattice-shaped pixel array, an interpolation process is performed as is necessary. For example, by using pixel data of adjacent pixels that are adjacent to a pixel corresponding to the display pixel on the image data, pixel data corresponding to the position of the display pixel is acquired through interpolation. The positions of the adjacent pixels referred to at the time of the interpolation process, a weighting coefficient (an interpolation coefficient) by which the pixel data of the adjacent pixels is multiplied at the time of the interpolation process, and the like may be acquired in advance as a part of the correction information. By performing such a process for display pixels and non-display pixels that are included in each projection area, partial image data for the projector responsible for each projection area can be acquired.

The image correction unit 53 outputs the partial image data that is generated by the calculation section to the image output unit 54. The image output unit 54 outputs the partial image data output from the image correction unit 53 to the projector that is responsible for each partial image data. For example, the image output unit 54 outputs the partial image data representing the first partial image P1 shown in FIG. 1 to the first projector 21. The image output unit 54, similarly, outputs the partial image data representing the second to fourth partial images P2 to P4 to the second to fourth projectors 22 to 24.

The correction information calculating device 6 of this embodiment realizes the function by allowing the second computer to perform a predetermined process (to be described later) by using a program. The second computer is formed separately from the first computer in which the image control device 5 is installed and is electrically connected to the first computer, for example, through a bus cable or the like. It may be configured that, after the correction information is calculated by the correction information calculating device 6, the correction information is output to the image control device 5 through a bus cable, and then, a content image P is displayed by using the plurality of the projectors 2 and the image control device 5 in a state in which the second computer (the correction information calculating device 6) and the photographing device 4 are detached. In addition, it may be configured that, when there is displacement of the position in the projector 2, the second computer (the correction information calculating device 6) and the photographing device 4 are installed again, the correction information is recalculated, and the correction information is updated.

The correction information calculating device 6 includes a correction information calculating unit 61, a position information acquiring unit 62, a storage unit 63, a first diagram position detecting unit 64, and a second diagram position detecting unit 65. The storage unit 63 is configured by a hard disk or a memory of the second computer. In the storage unit 63, measurement image data (original data) representing a first measurement image and a second measurement age (measurement pattern) that are used for calculating the correction information is stored. The measurement patterns for the projectors may be the same or different from one another for the plurality of projectors 2. In this embodiment, measurement patterns that are different for the plurality of projectors 2 are used. The measurement image data may be stored in the storage unit of the first computer or another storage unit.

As shown in FIG. 4, each measurement pattern is configured by an array of pixels that are arranged in the direction of "i" and the direction of "j". The measurement image data is formed so as to match the array of the pixels of the image forming element in a step in which the measurement image data is supplied to each projector. For example, in a case where the array of the pixels of the image forming element is 1920×1080, the measurement image data is supplied to the projector as the image data of an image in which 1920 pixels are aligned in the direction of "i" and 1080 pixels are aligned in the direction of "j".

A first measurement pattern D11 used for the first projector includes one of a first diagram D111 and a plurality of second diagrams D121. The first diagram D111 of this embodiment has a rectangular shape and is disposed on an approximate center of the first measurement pattern D11. The second diagram D121 is different from the first diagram D111 in at least one of the shape and the size.

The second diagram D121 is configured by a characteristic diagram. The characteristic diagram is a diagram having a shape or a luminance distribution that can be detected by using an image processing technology such as an edge detecting process or a pattern recognizing process and is a diagram from which a point representing the characteristic diagram can be acquired as a characteristic point when the characteristic diagram is detected. The shape of the characteristic diagram is not particularly limited as long as it is a shape which can be detected and from which a position relating to the shape thereof can be specified as the position of a characteristic point. For example, the shape of the characteristic diagram may be a crossed segment (crossed hatch), a square, or the like.

The second diagram of this example is configured by a dot-shaped (spot-shaped) characteristic diagram. For example, in a case where the characteristic diagram has a dot shape, by detecting the contour of the dot shape or a luminance distribution by using the above-described image processing technology, the center point of the dot shape is acquired, and the center point may be used as the characteristic point. On the other hand, in a case where the characteristic diagram has a rectangular shape, four apexes can be used as the characteristic points in addition to using the center point as the characteristic point, similarly to the case of a dot shape. In other words, segments corresponding to each side of the rectangular shape can be detected by half conversion or the like, and four apexes that are intersections of the detected segments can be acquired as the characteristic points. In other words, the first diagram D111 can be used as a characteristic diagram including four characteristic points.

The first diagram D111 may be set as a diagram that can be detected by using the above-described image processing technology more easily than the second diagram D121. Generally, a diagram to be detected can be more easily detected as the size of the diagram is increased, that is, the ratio of the size of the characteristic diagram to the size of the measurement pattern is increased. In addition, as a diagram to be detected has a simpler shape (for example, a rectangular shape or a circular shape), an abrupt change in the brightness on the edge becomes more remarkable, whereby the diagram can be easily detected. In this example, the first diagram D111 is larger than the second diagram D121, and accordingly, the first diagram D111 diagram can be easily detected.

In this example, the hue of the first diagram D111 defined in the measurement image data is different from that of the second diagram D121. The hue of the second diagram D121 is set to a hue having visual sensitivity (optical absorptance of a human cone cell) higher than the hue of the first diagram D111, that is, for example, green. The hue of the first diagram D111, for example, is set to blue or red.

A plurality of the second diagrams D121 is arranged in the direction of "i" with a predetermined pitch, and is arranged in the direction of "j" with a predetermined pitched. In other words, the plurality of the second diagrams D121 is regularly arranged, so that the characteristic point of each characteristic diagram is positioned on a lattice point of an orthogonal lattice.

In addition, measurement patterns for the second to fourth projectors are the same as the first measurement pattern D11 except for the disposition of the second diagram. In other words, a second measurement pattern D12 for the second projector includes one of the first diagram D112 and a plurality of the second diagrams D122. A third measurement pattern D13 for the third projector includes one of the first diagram D113 and a plurality of the second diagrams D123. A fourth measurement pattern D14 for the fourth projector includes one of the first diagram D114 and a plurality of the second diagrams D124. The shapes and the sizes of the first diagrams D111 to D114 are the same. The second diagrams D121 to D124 are two-dimensionally arranged regularly for each measurement pattern.

In one pair of the measurement patterns projected onto one pair of the projection areas that are adjacent to each other, the disposition of the second diagrams are set such that the second diagrams disposed on the end portions thereof do not overlap each other in a state in which the end portions thereof overlap each other so as not to be out of alignment. More specifically, the first measurement pattern D11 and the second measurement pattern D12 approach each other from a state being aligned in the direction of "i" with the positions in the direction of "j" being uniform, so that the end portions thereof overlap each other. In this state, the relationship between the disposition of the second diagrams D121 and the disposition of the second diagrams D122 are set such that the second diagrams D121 disposed in the end portion of the first measurement pattern D11 and the second diagrams D122 disposed in the end portion of the second measurement pattern D12 are alternately aligned in the direction of "j". In addition, the relationship between the disposition of the second diagrams D123 and the disposition of the second diagrams D124 is set so as to satisfy the same condition also for the third and fourth measurement patterns D13 and D14.

In addition, the first measurement pattern D11 and the third measurement pattern D13 approach each other from a state being aligned in the direction of "j" with the positions in the direction of "i" being uniform, so that the end portions thereof overlap each other. In this state, the relationship between the disposition of the second diagrams D121 and the disposition of the second diagrams D123 are set such that the second diagrams D121 disposed in the end portion of the first measurement pattern D11 and the second diagrams D123 disposed in the end portion of the third measurement pattern D13 are alternately aligned in the direction of "i". In addition, the relationship between the disposition of the second diagrams D122 and the disposition of the second diagrams D124 is set so as to satisfy the same condition also for the second and fourth measurement patterns D12 and D14.

The first measurement pattern D11 is projected by the first projector 21 and represents a first projection measurement pattern T11 in the first projection area A1 of the projection surface 9. The first projection measurement pattern T11 includes a first projection diagram T111 corresponding to the first diagram D111 and a second projection diagram T121 corresponding to the second diagram D121. Similarly, the second to fourth measurement patterns D12 to D14 are projected by the second to fourth projectors 22 to 24 and represent second to fourth projection measurement patterns T12 to T14 in the second to fourth projection areas A2 to A4 of the projection surface 9. The second to fourth projection measurement patterns T12 to T14 include first projection diagrams T112 to T114 corresponding to the first diagrams D112 to D114 and second projection diagrams T122 to T124 corresponding to the second diagrams D122 to D124. In this embodiment, since the relationship of the disposition of the second diagrams is set as described above, the second projection diagrams displayed in the end portions of one pair of the projection areas of which the end portions overlap each other do not overlap each other.

Returning to the description presented with reference to FIG. 3, the correction information calculating unit 61, the position information acquiring unit 62, the first diagram position detecting unit 64, and the second diagram position detecting unit 65 are configured by the CPU, the memory, and the like of the second computer. The correction information calculating unit 61 calculates the correction information that represents the correspondence relationship between the position of the pixel on the projection surface 9 and the position of the pixel of the image forming element of the projector by comparing the position of the second diagram inside the second photographed image that is detected by the second diagram position detecting unit 65 and the position of the second diagram on the original data of the second measurement image. When calculating the correction information, the correction information calculating unit 61 reads out the measurement image data that is stored in the storage unit 63 and directly or indirectly outputs the measurement image data to each projector. Here, the correction information calculating unit 61 outputs the measurement image data to the image correction unit 53 of the image control device 5. The measurement image data is indirectly output to each projector through the image control device 5. The image control device 5 corrects the measurement image data in a format matching the array of the pixels of the image forming element as is necessary. The first to fourth projectors 21 to 24 project the measurement pattern onto the projection surface 9 based on the supplied measurement image data.

The first diagram position detecting unit 64 receives photographed image data representing a photographed image acquired by photographing a measurement pattern projected onto the projection surface 9. The first diagram position detecting unit 64 detects the measurement pattern (hereinafter, referred to as a photographed pattern) transferred to the photographed image, for example, by performing an edge process, a pattern recognizing process, or the like for the photographed image data. The first diagram position detecting unit 64 stores the image data representing the detected photographed pattern in the storage unit 63.

The first diagram position detecting unit 64 performs a first process of detecting the position of each first diagram included in the photographed pattern. The first diagram position detecting unit 64 of this embodiment detects four apexes of the rectangular-shaped first diagram by using half conversion and outputs a set of data representing the positions of the four apexes as the first diagram information to the second diagram position detecting unit 65.

When failing to detect the position of the first diagram through the first process, the first diagram position detecting unit 64 outputs information representing a detection failure to the position information acquiring unit 62. When failing to detect the position of the first diagram, the first diagram position detecting unit 64 receives first position information from the position information acquiring unit 62. The first position information is information that represents a rough position in which the first diagram occupies inside the photographed pattern, for example, a position on the inner side of the first diagram that is selected by the user.

The first diagram position detecting unit 64 performs a second process of detecting the position of each first diagram with the position represented by the first position information used as a reference. In the second process, the search range is limited to the periphery of the reference position, and closer detection is performed by setting the unit area for a search to be smaller than that of the first process. Accordingly, the precision of the search can be improved without increasing the calculation load, and the success rate of detection of the position of the first diagram is higher than that of the first process. When succeeding in detection of the position of the first diagram through the second process, the first diagram position detecting unit 64 outputs the first diagram information to the second diagram position detecting unit 65.

On the other hand, when failing to detect the position of the first diagram through the second process, the first diagram position detecting unit 64 outputs information indicating a detection failure to the position information acquiring unit 62 and receives second position information from the position information acquiring unit 62. The second position information is information representing a position designated by the user as the positions (here, the positions of four apexes of the rectangular shape) of the characteristic points of the first diagram inside the photographed pattern. The first diagram position detecting unit 64 outputs the positions of the characteristic points represented by the received second position information to the second diagram position detecting unit 65 as the first diagram information. As above, the first position information and the second position information are information input by the user as information representing the positions corresponding to the first diagram inside the first photographed image.

When information indicating a detection failure in the first process or the second process is output from the first diagram position detecting unit 64, the position information acquiring unit 62 notifies the user of the detection failure through a graphic user interface (hereinafter, referred to as a GUI) 66 and accepts the input of the first position information. The GUI 66 displays information representing the progress or results of various processes, for example, using the monitor of the second computer. The user can input the first position information, the second position information, or the like as is necessary by using an input device such as a keyboard or a mouse that is connected to the second computer in accordance with the progress or the results of various processes. Here, the position information acquiring unit 62 receives information indicating a detection success through the first or second process from the first diagram position detecting unit 64 and notifies the user of the detection success through the GUI 66.

The second diagram position detecting unit 65 reads out image data representing a photographed pattern from the storage unit 63 and performs a process of detecting the second diagram by referring to the above-described first diagram information output from the first diagram position detecting unit 64. For example, the second diagram position detecting unit 65 estimates a range of a projection area in which the first diagram is projected on a photographed pattern by referring to the first diagram information output from the first diagram position detecting unit 64. The second diagram position detecting unit 65 detects the second diagram by searching the inner side of the estimated range of each projection area and acquires the position of the characteristic point, which is defined in each detected second diagram, on the photographed pattern. The second diagram position detecting unit 65 outputs the acquired position of each characteristic point to the correction information calculating unit 61 as data for each projection area to which the target characteristic point belongs.

In addition, for example, the second diagram position detecting unit 65 may be configured to estimate an approximate position of each second diagram on the photographed pattern by using the relative position of each second diagram with respect to the first diagram that is defined in the measurement image data. When each second diagram is detected by analyzing the periphery of the estimated approximate position, projection can be precisely performed without increasing the calculation load, whereby the second diagram can be detected with high precision. Furthermore, in a case where detection of several second diagrams fails, for example, the second diagram position detecting unit 65 may be configured to calculate the position of the characteristic point defined in the second diagram by using a value estimated as the approximate position of the second diagram. In such a case, divergence of the process due to the failure of detection of the second diagram can be avoided.

In other words, the second diagram position detecting unit 65 can detect the position of the second diagram inside a second estimated image by using the positional relationship of the position of the second diagram on the original data of the second measurement image with respect to the position of the first diagram on the original data of the first measurement image. In this embodiment, since both the first diagram and the second diagram are included in the measurement pattern, the positional relationship thereof in the original data can be easily acquired. In addition, even in a case where the first measurement image including the first diagram and the second measurement image including the second diagram are images different from each other, when the correspondence relationship between the pixels configuring the original data of the images is known, it is possible to acquire the positional relationship between the first diagram and the second diagram. Accordingly, one image serving as the first measurement image and the second measurement image may be used, and different two images may be used as the first measurement image and the second measurement image.

As above, the second diagram position detecting unit 65 can detect the position, of the second diagram inside the second photographed image by using a detection result at a time when the position of the first diagram inside the first photographed image is detected by the first diagram position detecting unit 64 with the position represented by the first position information or the second position information used as a reference and the positional relationship of the position of the second diagram on the original data of the second measurement image with respect to the position of the first diagram on the original data of the first measurement image.

The correction information calculating unit 61 calculates the correction information by comparing the detected position of the characteristic point that is detected by the second diagram position detecting unit 65 and the position of the characteristic point on the measurement image data. The correction information calculating unit 61 outputs the calculated correction information to the image control device 5. The image control device 5 stores the correction information that is output from the correction information calculating device 6 in the memory section of the image correction unit 53 so as to update the correction information.

Figure 5:
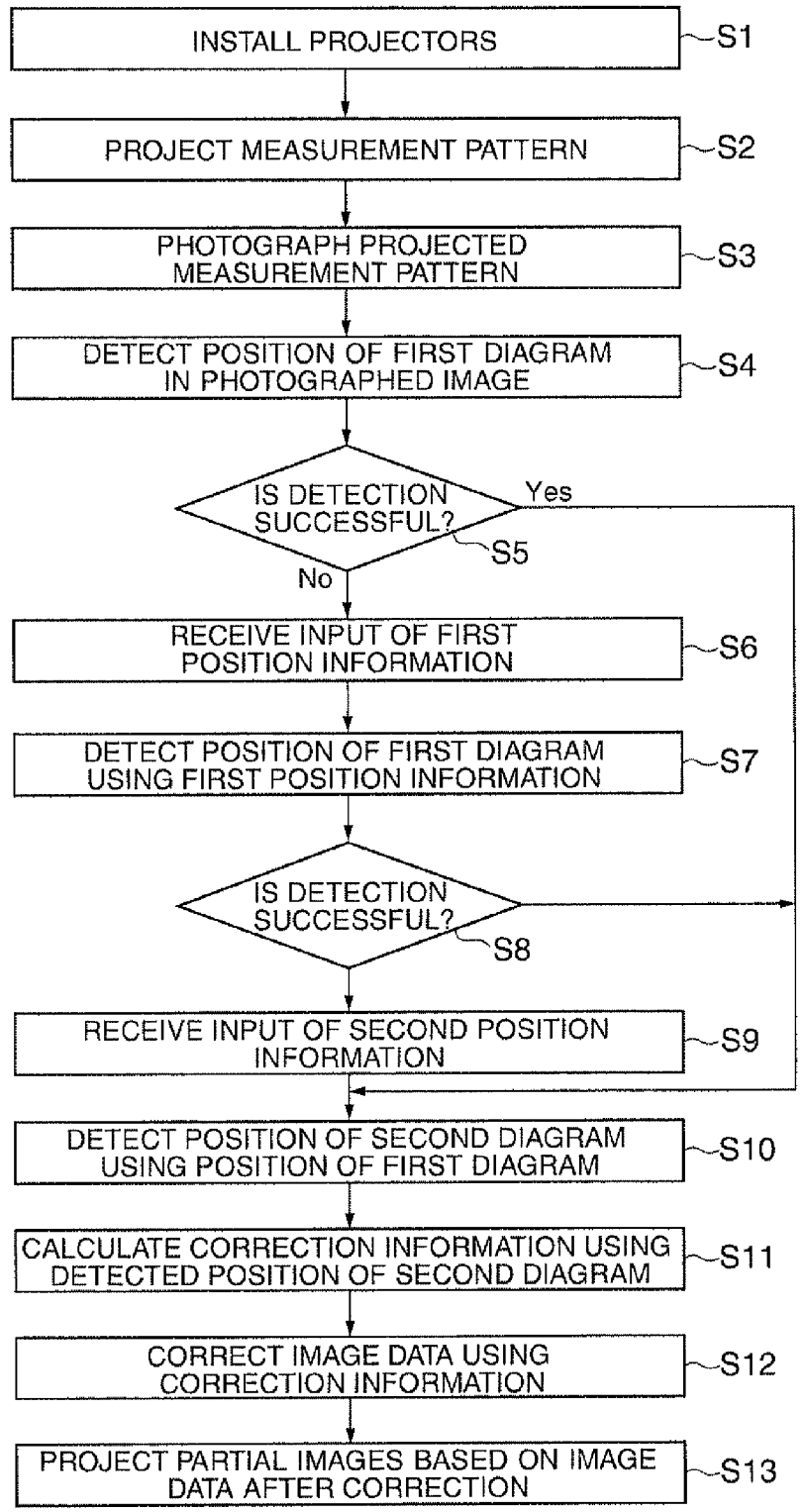
FIG. 5 is a flowchart representing the process flow until a content image is displayed.
Figure 6:
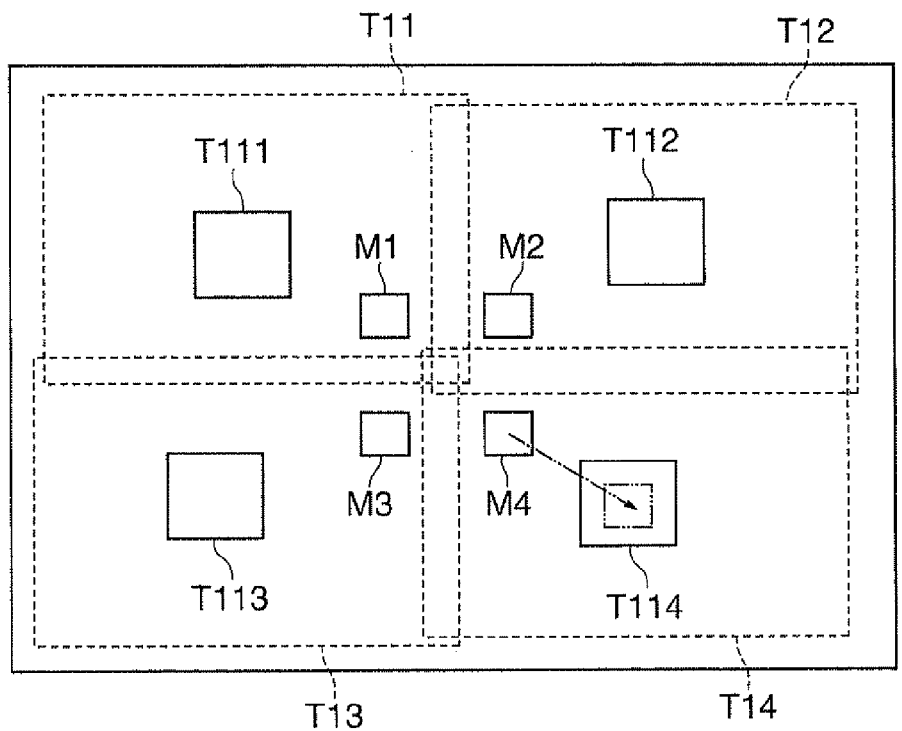
FIG. 6 is an explanatory diagram illustrating an example of an input method of first position information.
Figure 7:
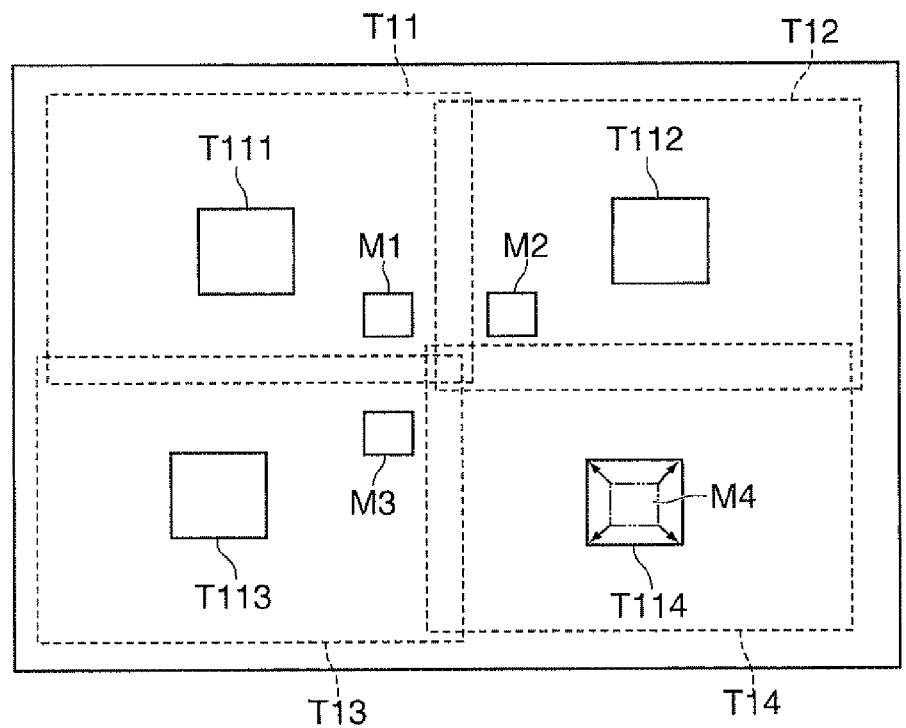
FIG. 7 is an explanatory diagram illustrating an example of an input method of second position information.

FIG. 5 is a flowchart representing the process flow until a content image P is displayed. FIG. 6 is an explanatory diagram illustrating an example of an input method of the first position information. FIG. 7 is an explanatory diagram illustrating an input method of the second position information. In FIGS. 6 and 7, the second diagram is not shown. Here, an example will be described in which the correction information is calculated at the time of installation of the image display system 1.

By performing the processes of Steps S4 to S12 as below, one type of an image processing method according to an embodiment of the invention can be performed. By using a program that allows a computer to perform the processes of Steps S6, S7, S10, and S11, the function of a correction information calculating device according to an embodiment of the invention can be realized. By using a program that allows a computer to perform the processes of Steps S6, S7, and S10 to S12, the function of an image processing apparatus according to an embodiment of the invention can be realized.

As shown in FIG. 5, first, a plurality of projectors 2 is disposed on the projection surface 9, and the arrangement of the projectors is roughly adjusted as is necessary (Step S1). In Step S1, for example, a disposition guide representing the contour of the projection area (hereafter, referred to as a partial projection area) is projected onto a projection surface 9 from each of the first to fourth projectors 21 to 24. Then, each projector is moved while referring to the disposition guide, whereby the position of each projection area occupying the total projection area A0 is roughly adjusted. In a case where the correction information is calculated after the installation of the image display system 1, for example, at the time of maintenance of the image display system 1, the above-described Step S1 may be omitted.

Next, the correction information calculating unit 61 of the correction information calculating device supplies the measurement image data representing the measurement pattern of each projector to a target projector. Then, the first to fourth projectors 21 to 24 are operated so as to project the measurement patterns onto the projection surface 9 based on the supplied measurement image data (Step S2). Here, the measurement patterns are projected in parallel by the first to fourth projectors 21 to 24.

Next, the photographing device 4 photographs an area including the projected measurement patterns T11 to T14 on the projection surface 9 (Step S3).

Next, the first diagram position detecting unit of the correction information calculating device 6 performs a process of detecting a measurement pattern (a photographed pattern) inside the photographed image photographed by the photographing device 4 and detecting the position of the first diagram inside the photographed pattern (Step S4).

Next, the first diagram position detecting unit determines whether or not the first process of detecting the first diagram is successful (Step S5). For example, in a case where the number of the detected characteristic points of the first diagram does not coincide with the number of the characteristic points of the first diagram defined in the measurement image data, a case where the number of the first diagrams does not match the number of the projectors, or a case where correlation between a diagram formed by joining the detected characteristic points of the first diagram and the shape of the first diagram defined in the measurement image data is acquired, and the correlation is less than a threshold value, a failure of detection of the position of the first diagram through the first process is determined.

When determining a success of detection of the position of the first diagram through the first process (Step S5; Yes), the first diagram position detecting unit 64 outputs the detected position of the first diagram to the second diagram position detecting unit 65.

On the other hand, when determining a failure of detection of the position of the first diagram through the first process (Step S5; No), the first diagram position detecting unit 64 outputs information indicating a detection failure through the first process to the position information acquiring unit 62.

When receiving the information indicating the detection failure of the first process, the position information acquiring unit 62 notifies the user of the detection failure through the GUI 66 and receives input of the first position information (Step S6).

As shown in FIG. 6, for example, the GUI 66 displays an image corresponding to the photographed pattern on the monitor of the second computer. In addition, the GUI 66 displays the first diagrams defined in the measurement image data as icons M1○M4 together with the photographed pattern in an overlapping manner. The user drags and drops an icon M4 corresponding to the first projection diagram T114 by using a mouse up to the inner side of the first projection diagram T114 displayed on the monitor, for example, by setting the first projection diagram T114 included in the fourth projection measurement pattern T14 as a target. The GUI 66 outputs information representing the position to which the icon M4 is dropped to the position information acquiring unit as the first position information. The position information acquiring unit 62 acquires the first position information input by the user through the GUI 66 and outputs the first position information to the first diagram position detecting unit 64. The first diagram position detecting unit 64 performs the second process of detecting the position of the first diagram by using the first position information output from the position information acquiring unit 62 (Step S7).

The first diagram position detecting unit 64 determines whether or not the second process of detecting the position of the first diagram is successful, similarly to Step S5 (Step S8).

When determining the detection of the position of the first diagram through the second process to be successful (Step S58; Yes), the first diagram position detecting unit 64 outputs the detected position of the first diagram to the second diagram position detecting unit 65. For example, the GUI 66 receives the information indicating the success of detection of the position of the first diagram, changes the color of the first projection diagram T114 on the monitor shown in FIG. 6, and displays the first diagram on the monitor using a value detected as the position of the first diagram, thereby notifying the user of the success of detection of the position of the first diagram. The user can check whether or not the detection is successful based on the first diagram of the detection result displayed on the monitor together with the photographed pattern in an overlapping manner.

On the other hand, when determining the detection of the position of the first diagram to be a failure through the second process (Step S8; No), the first diagram position detecting unit 64 outputs information indicating a failure of the detection through the second process to the information acquiring unit 62.

The position information acquiring unit 62 receives the information indicating the failure of the detection of the second process, notifies the user of the detection failure through the GUI 66 (Step S9), and receives input of the second position information (Step S9). As shown in FIG. 7, the user drags and moves each apex of the icon M4 displayed inside the first projection diagram T114 on the monitor, for example, by using a mouse and drops the apex at a position of each apex of the first projection diagram T114 on the monitor. The GUI 66 outputs information representing the positions at which each apex of the icon M4 is dropped to the position information acquiring unit 62 as the second information. The position information acquiring unit 62 acquires the second position information input by the user through the GUI 66 and outputs the second position information to the first diagram position detecting unit 64. In addition, even when the first diagram position detecting unit 64 determines the detection of the position of the first diagram to be successful through the first or second process, there is a case where the detection actually fails. As described above, the user can check the success or failure of the detection on the monitor. When the first diagram position detecting unit 64 determines the detection of the position of the first diagram to be successful, the user can update the detection result of the first diagram position detecting unit 64 with the second position information by inputting the second position information based on his or her determination.

The position information acquiring unit 62 acquires the second position information input by the user through the GUI 66 and outputs the second position information to the first diagram position detecting unit 64. The first diagram position detecting unit 64 outputs the position of the characteristic point represented by the second position information output from the position information acquiring unit 62 to the second diagram position detecting unit 65.

The second diagram position detecting unit 65 detects the position of the second diagram using the position of the characteristic point of the first diagram that is output from the first diagram position detecting unit 64 and outputs the detected position of the characteristic point of the second diagram to the correction information calculating unit 61 (Step S10).

The correction information calculating unit 61 calculates the correction information representing the correspondence relationship between the position of a pixel on the projection surface 9 and the position of a pixel of the image forming element of each projector by comparing, the position of each characteristic point of the second diagram that is output from the second diagram position detecting unit 65 with the position of each characteristic point of the second diagram defined in the measurement image data as the position of the characteristic point on the projection surface 9 (Step S11).

The method of calculating the correction information is not particularly limited, as long as it is a method capable of acquiring information representing the position of the pixel of the image forming element of each projector and the position of the pixel on the projection surface 9. For example, as the method of calculating the correction information, there are the following two methods.

In a first method, the correction information calculating unit 61 acquires a projection conversion in which the measurement pattern defined in the measurement image data is converted into a photographed pattern. Through this projection conversion, the coordinates (i,j) of each pixel on the image data is converted, and the correction information as a data table for each pixel is calculated. In addition, even in a case where a projection conversion for converting the photographed pattern into a measurement pattern defined in the measurement image data is acquired, correction information representing the correspondence relationship between the coordinates of the pixel of the image forming element and the position of the pixel on the projection surface is acquired.

Figure 8:
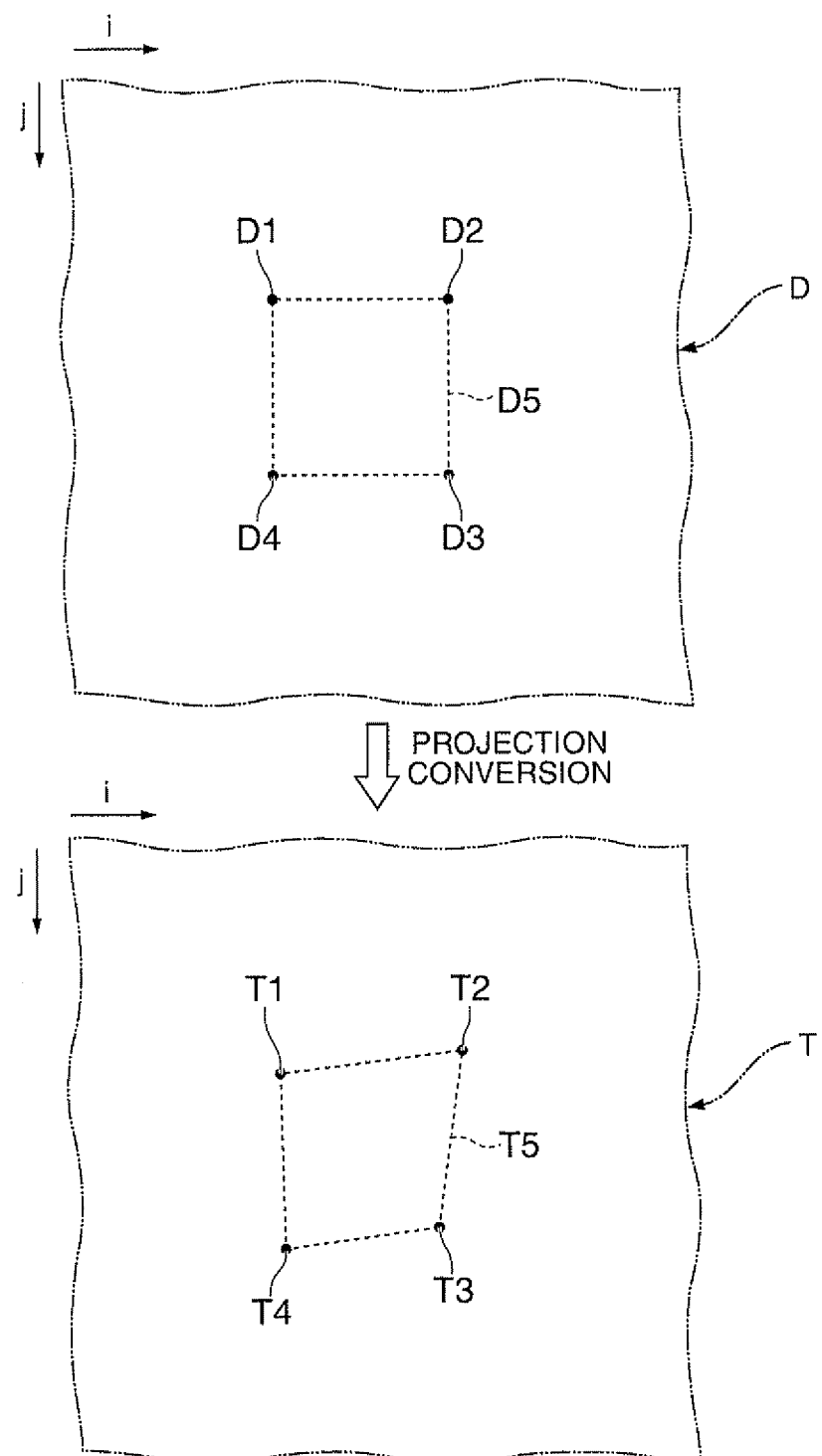
FIG. 8 is an explanatory diagram illustrating an example of a calculation method of correction information.

FIG. 8 is an explanatory diagram showing an example of a method of calculating the correction information. FIG. 8 conceptually illustrates a part of the measurement pattern D defined in the measurement image data and the photographing pattern T on the image data. In FIG. 8, reference numerals D1 to D4 represent characteristic points included in the measurement pattern D. The characteristic points D1 to D4 are selected such that a line sequentially joins the characteristic points forms the contour of the area D5. In FIG. 8, reference numeral T1 to T4 represents the characteristic points included in a photographed pattern T. The characteristic points T1 to T4 are characteristic points corresponding to the characteristic points D1 to D4 of the projected measurement pattern D. A line sequentially joining the characteristic points T1 to T4 forms the contour of the area T5.

The conversion equations for the projection conversion can be represented in Equations (1) and (2) shown below. In Equations (1) and (2), (x, y) represents the ij coordinates (i,j) of an arbitrary point before conversion, and (X, Y) represents the ij coordinates (i,j) of the converted position of this point. In addition, a to h represent conversion coefficients, and by acquiring a to h, one projection conversion is acquired.

$$X=(ax+by+c)/(gx+hy+1) \quad (1)$$

$$Y=(dx+ey+f)/(gx+hy+1) \quad (2)$$

Each of the coordinates of the characteristic points D1 to D4 are defined in the measurement image data and are known. Each of the coordinates of the characteristic points T1 to T4 are known by detecting the characteristic points from the photographed pattern T. When (x, y) shown in Equations (1) and (2) are substituted by the coordinates of the characteristic point D1, and (x, Y) is substituted by the coordinates of the characteristic points T1, two relational equations of a to h are acquired. Similarly, by substituting the coordinates of a set of characteristic points D2 and T2, a set of characteristic points D3 and T3, and a set of characteristic points D4 and T4 coordinates in the equations, eight relational equations are acquired for eight unknown letters a to h. By solving this linear equations with eight variables, a to h used for the projection conversion for converting the area D5 into the area T5 are acquired. By substituting (x, y) with the coordinates of each pixel included on the periphery and the inside of the area D5 in the acquired projection conversion, the coordinates of each pixel, which has one-to-one correspondence for each pixel of the area D5, on the area T5 are acquired.

Here, the characteristic points D1 to D4 are selected based on the characteristic points included in the measurement pattern, and a projection conversion for the area D5 forming a part of the measurement pattern D is acquired. Then, by selecting other characteristic points as the characteristic points D1 to D4, the projection conversion is acquired with a different area D5. By using the acquired projection conversion, as described above, the coordinates of each pixel of the area T5 that has one-to-one correspondence relationship for each pixel of the area D5 are acquired. As above, the coordinates of each pixel of the measurement pattern and the coordinates of the pixel of the photographed pattern corresponding to each pixel are acquired by acquiring the projection conversion for each part of the measurement pattern. The coordinates of each pixel of the measurement pattern has a correspondence relationship with the position of the pixel of the image forming element of the projector. In addition, the coordinate of the photographed pattern has a correspondence relationship with the position of the pixel on the projection surface. Accordingly, as a result, correction information that represents the correspondence relationship between the coordinates of the pixel of the image forming element and the position of the pixel is acquired.

For example, by performing the above-described projection conversion for each of the coordinates of each pixel of the image forming element, the coordinates of the pixel (hereinafter, referred to as a converted pixel) on the projection surface 9 are acquired. By referring to a maximum value and a minimum value of the coordinates of the converted pixel, the range of the effective projection area A is set automatically or manually. Then, by arranging the array of the pixels (display pixels) corresponding to the format of the content image or the number of pixels, the coordinates of each display pixel on the projection surface 9 are acquired based on the set values of the effective projection area A. In a case where the coordinates of the display pixel are mismatched with the coordinates of the converted pixel, an interpolation coefficient representing the weight of the interpolation corresponding to a distance between the peripheral converted pixel and the display pixel may be acquired, so that the pixel data of a display pixel can be acquired through interpolation by using the image data supplied to converted pixels located on the periphery of the display pixel. This interpolation coefficient is fixed for each display pixel and may be stores as a part of the correction information.

In a second method, a projection conversion (an inverse conversion of the projection conversion according to the first method) for converting the photographed pattern into a measurement pattern defined in the measurement image data is acquired. In addition, for example, the range of the total projection area A0 is estimated by using the position of the characteristic point included in the photographed pattern, and the range of the effective projection area A is set automatically or manually. By arranging the array of the display pixels corresponding to the format of the content image or the number of pixels inside the effective projection area A, the coordinates of each display pixel on the projection surface 9 are acquired based on the set value of the range of the effective projection area A. By converting the acquired coordinate of each display pixel through projection conversion, the position of the pixel (hereinafter, referred to as a modulation unit), which corresponds to each display pixel on the projection surface 9, on the image forming element is acquired. In a case where the acquired position of the modulation unit is not matched with the actual position of the modulation unit, in other words, in a case where two or more display pixels corresponds to the modulation unit, an interpolation coefficient may be acquired, so that the pixel data input to each modulation unit can be acquired through interpolation as is necessary. As described above, the acquired interpolation coefficient may be stores as a part of the correction information.

Returning back to the description presented with reference to FIG. 5, in a case where the content image P is displayed, the image control device 5 generates partial image data for each projector based on the image data representing the content image P, and performs a position correction process for the image data by using the correction information (Step S12).

Next, the image processing apparatus 3 supplies the partial image data after the position correcting process to the target projector. Each of the first to fourth projectors 21 to 24 projects a partial image based on the supplied partial image data (Step S13). As above, the content image P formed from the first to fourth partial images P1 to P4 is displayed.

According to the correction information calculating device 6 of this embodiment, the first diagram is detected by using the position information input by the user. Accordingly, the success rate of detection of the first diagram increases, thereby the position of the second diagram can be precisely acquired. Since the shapes or the sizes of the first diagram and the second diagram are different from each other, it is easy for the user to differentiate the first diagram from the second diagram. Accordingly, the user's effort for searching for the first diagram can be reduced, and occurrence of user's incorrect recognition of the first diagram can be decreased. Accordingly, the correspondence relationship between the characteristic point transferred into the photographed image and the characteristic point on the projection surface can be precisely acquired while suppressing the user's burden.

In addition, when the first diagram position detecting unit 64 succeeds in detecting the position of the first diagram, user's input of the position information can be omitted. Accordingly, the user' burden can be suppressed to a minimum level. In addition, since the user can input the first position information representing a position located on the inner side of the first diagram, the position that becomes a reference for detection of the first diagram can be designated in an easy manner. Furthermore, when the first diagram position detecting unit 64 fails to detect the position of the first diagram through the second process, the process is continued using the second position information, and accordingly, the degree of robustness of the process can be improved.

In addition, since the hues of the first and second diagrams are different from each other, the user can easily differentiate the first diagram from the second diagram, whereby the user's burden required for searching for the first diagram can be suppressed to a minimum level. In addition, in a case where the position of one of the first and second diagrams is detected, filtering using a difference in colors can be performed so as to eliminate the influence of the other diagram. Accordingly, the success rate of detection of the position of the first diagram or the second diagram can be increased.

According to the above-described reasons, the image processing apparatus 3 of this embodiment can correct the distortion of partial images and the difference in the relative positions of the partial images without any effort for acquiring the correction information. In addition, the image display system 1 of this embodiment has a high degree of convenience and can display a high-quality image. In addition, according to an image processing method of this embodiment, the correspondence relationship between the characteristic point transferred into a photographed image and the characteristic point on the projection surface can be precisely acquired while suppressing the user's burden to a minimum level, and image distortion or the like can be corrected with high precision without any effort for acquiring the correction information.

The technical scope of the invention is not limited to the embodiments described here. The embodiments can be changed in various forms without departing from the concept of the invention. For example, in this embodiment, although the measurement image including the first diagram and the second diagram is used, a first measurement image including only the first diagram and a second measurement image including only the second diagram may be used together.

The entire disclosure of Japanese Patent Application No. 2010-42465, filed Feb. 26, 2010 is expressly incorporated by reference herein.

What is claimed is:

1. A correction information calculating device comprising:
a position information acquiring unit that acquires position information, which is input by a user, as information representing a position corresponding to a first diagram located inside a first photographed image acquired by photographing the first diagram on a projection surface when a first measurement image including the first diagram is projected onto the projection surface from a projector;
a second diagram position detecting unit that detects a position of a second diagram inside a second photographed image acquired by photographing the second diagram on the projection surface by using a detection result at a time of detecting a position of the first diagram inside the first photographed image with a position represented by the position information used as a reference and a positional relationship of a position of the second diagram on original data of a second measurement image with respect to the position of the first diagram on original data of the first measurement image when the second measurement image including the second diagram that is different from the first diagram in at least one of a shape and a size is projected onto the projection surface from the projector; and
a correction information calculating unit that calculates correction information representing a correspondence relationship between a position of a pixel on the projection surface and a position of a pixel of an image forming element of the projector by comparing the position of the second diagram inside the second photographed image that is detected by the second diagram position detecting unit and the position of the second diagram on the original data of the second measurement image.

2. The correction information calculating device according to claim 1, further comprising a first diagram position detecting unit that detects the position of the first diagram inside the first photographed image,
wherein the second diagram position detecting unit detects the position of the second diagram inside the second photographed image using a detection result of the first diagram position detecting unit when the first diagram position detecting unit succeeds in detecting the first diagram and detects the position of the second diagram inside the second photographed image by using the position of the first diagram that is detected using the position information when the first diagram position detecting unit fails to detect the first diagram.

3. The correction information calculating device according to claim 1,
wherein the position information includes first position information representing a position of an inner side of the first diagram and second position information representing a position of a characteristic point that defines the position of the first diagram inside the first photographed image,
wherein the position information acquiring unit acquires the second position information when detection of the position of the first diagram using the first position information fails, and
wherein the second diagram position detecting unit detects the position of the second diagram inside the second photographed image by using the position of the first diagram that is defined in the characteristic point represented by the second position information as the position of the first diagram inside the first photographed image when the position information acquiring unit acquires the second position information.

4. The correction information calculating device according to claim 1,
wherein the first measurement image includes the second diagram, and
wherein the second diagram position detecting unit detects the position of the second diagram inside the second photographed image using the first photographed image as the second photographed image.

5. The correction information calculating device according to claim 4,
wherein a size of the first diagram is larger than a size of the second diagram, and
wherein the number of the second diagrams included in the first measurement image is greater than the number of the first diagrams included in the first measurement image.

6. The correction information calculating device according to claim 4,
wherein a hue of the first diagram is different from a hue of the second diagram in the first measurement image, and
wherein a photographed image acquired by photographing the first measurement image on the projection surface such that the hue of the first diagram is different from the hue of the second diagram is used as the first photographed image.

7. An image processing apparatus comprising:
the correction information calculating device according to claim 1; and
an image correcting unit that corrects image data such that an image projected onto the projection surface by projectors based on the image data after correction approximately coincides with an image represented by the image data before correction by referring to correction information calculated by the correction information calculating device.

8. An image processing apparatus comprising:
the correction information calculating device according to claim 2; and
an image correcting unit that corrects image data such that an image projected onto the projection surface by projectors based on the image data after correction approximately coincides with an image represented by the image data before correction by referring to correction information calculated by the correction information calculating device.

9. An image processing apparatus comprising:
the correction information calculating device according to claim 3; and
an image correcting unit that corrects image data such that an image projected onto the projection surface by projectors based on the image data after correction approximately coincides with an image represented by the image data before correction by referring to correction information calculated by the correction information calculating device.

10. An image processing apparatus comprising:
the correction information calculating device according to claim 4; and
an image correcting unit that corrects image data such that an image projected onto the projection surface by projectors based on the image data after correction approximately coincides with an image represented by the image data before correction by referring to correction information calculated by the correction information calculating device.

11. An image processing apparatus comprising:
the correction information calculating device according to claim 5; and
an image correcting unit that corrects image data such that an image projected onto the projection surface by projectors based on the image data after correction approximately coincides with an image represented by the image data before correction by referring to correction information calculated by the correction information calculating device.

12. An image processing apparatus comprising:
the correction information calculating device according to claim 6; and
an image correcting unit that corrects image data such that an image projected onto the projection surface by projectors based on the image data after correction approximately coincides with an image represented by the image data before correction by referring to correction information calculated by the correction information calculating device.

13. An image display system comprising:
the processing apparatus according to claim 7; and
a plurality of projectors that projects an image based on image data after correction that is corrected by the image processing apparatus.

14. An image display system comprising:
the processing apparatus according to claim 8; and
a plurality of projectors that projects an image based on image data after correction that is corrected by the image processing apparatus.

15. An image display system comprising:
the processing apparatus according to claim 9; and
a plurality of projectors that projects an image based on image data after correction that is corrected by the image processing apparatus.

16. An image display system comprising:
the image processing apparatus according to claim 10; and
a plurality of projectors that projects an image based on image data after correction that is corrected by the image processing apparatus.

17. An image display system comprising:
the image processing apparatus according to claim 11; and
a plurality of projectors that projects an image based on image data after correction that is corrected by the image processing apparatus.

18. An image display system comprising:
the image processing apparatus according to claim 12; and
a plurality of projectors that projects an image based on image data after correction that is corrected by the image processing apparatus.

19. A method of correcting an image, the method comprising:
projecting a first measurement image including a first diagram onto a projection surface from a projector;
acquiring a first photographed image by photographing the first diagram on the projection surface;
acquiring position information, which is input by a user, as information representing a position corresponding to the first diagram inside the first photographed image;
projecting a second measurement image including a second diagram that is different from the first diagram in at least one of a shape and a size on the projection surface from the projector;

acquiring a second photographed image by photographing the second diagram on the projection surface;

detecting a position of the first diagram inside the first photographed image with a position represented by the position information for the position of the second diagram inside the second photographed image used as a reference;

detecting a position of the second diagram inside the second photographed image by using a detection result of the position of the first diagram inside the first photographed image and a positional relationship of the position of the second diagram on original data of the second measurement image with respect to the position of the first diagram on original data of the first measurement image;

calculating correction information representing a correspondence relationship between a position of a pixel on the projection surface and a position of a pixel of an image forming element of the projector by comparing a detection result of the position of the second diagram inside the second photographed image and the position of the second diagram on the original data of the second measurement image; and correcting image data such that an image projected onto the projection surface by the projector based on the image data after correction approximately coincides with an image represented by the image data before correction by referring to the correction information.

* * * * *